(12) United States Patent
Oh et al.

(10) Patent No.: US 8,379,094 B2
(45) Date of Patent: Feb. 19, 2013

(54) APPARATUS AND METHOD FOR OBTAINING MOTION ADAPTIVE HIGH DYNAMIC RANGE IMAGE

(75) Inventors: Hyun-Hwa Oh, Hwaseong-si (KR); Won-Hee Choe, Hwaseong-si (KR); Seong-Deok Lee, Suwon-si (KR); Hyun-Chul Song, Seoul (KR); Sung-Chan Park, Suwon-si (KR); Young-Jin Yoo, Hwaseong-si (KR); Jae-Hyun Kwon, Hwaseong-si (KR); Kang-Eui Lee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/485,357

(22) Filed: May 31, 2012

(65) Prior Publication Data

US 2012/0236169 A1 Sep. 20, 2012

Related U.S. Application Data

(62) Division of application No. 12/842,109, filed on Jul. 23, 2010.

(30) Foreign Application Priority Data

Jul. 23, 2009 (KR) .................. 10-2009-0067387

(51) Int. Cl.
*H04N 5/228* (2006.01)
*H04N 5/217* (2006.01)
*G06K 9/40* (2006.01)

(52) U.S. Cl. .......... 348/208.13; 348/208.99; 348/208.1; 348/208.4; 348/222.1; 348/241; 382/255

(58) Field of Classification Search ............. 348/208.99, 348/208.1–208.6, 208.12–208.16, 218.1, 348/222.1, 239, 241, 296, 362–368; 382/107, 382/254–255, 274–275, 278, 284, 293–295
See application file for complete search history.

(56) References Cited

U.S. PATENT DOCUMENTS

| | | | |
|---|---|---|---|
| 6,720,993 B1 | 4/2004 | Hwang et al. | |
| 6,952,234 B2 | 10/2005 | Hatano | |
| 7,098,946 B1 | 8/2006 | Koseki et al. | |
| 7,301,563 B1 * | 11/2007 | Kakinuma et al. | 348/208.13 |
| 2002/0154829 A1 * | 10/2002 | Tsukioka | 382/254 |
| 2003/0133035 A1 * | 7/2003 | Hatano | 348/362 |
| 2004/0218830 A1 | 11/2004 | Kang et al. | |
| 2005/0046708 A1 * | 3/2005 | Lim et al. | 348/231.6 |
| 2006/0033817 A1 * | 2/2006 | Ishikawa et al. | 348/208.2 |
| 2007/0092244 A1 * | 4/2007 | Pertsel et al. | 396/153 |
| 2007/0139547 A1 * | 6/2007 | Horiuchi | 348/362 |
| 2007/0248166 A1 * | 10/2007 | Chen et al. | 375/240.16 |

(Continued)

FOREIGN PATENT DOCUMENTS

| | | |
|---|---|---|
| EP | 1 689 164 | 8/2006 |
| JP | 2000-092378 | 3/2000 |

(Continued)

*Primary Examiner* — Jason Chan
*Assistant Examiner* — Michael Osinski
(74) *Attorney, Agent, or Firm* — NSIP Law

(57) ABSTRACT

Disclosed is an apparatus and method for obtaining a motion adaptive high dynamic range image, in which a motion degree of a first image and a second taken using different exposure times is calculated. The motion calculation intensity is adjusted based on the calculated motion degree. The motion compensation intensity involves a global motion compensation and/or a location motion compensation. Images subjected to compensation are synthesized and output, so that an image having high dynamic range is obtained.

7 Claims, 7 Drawing Sheets

U.S. PATENT DOCUMENTS

| | | | | |
|---|---|---|---|---|
| 2007/0285521 | A1* | 12/2007 | Watanabe et al. | 348/208.99 |
| 2009/0067752 | A1* | 3/2009 | Lee et al. | 382/294 |
| 2009/0115860 | A1* | 5/2009 | Nakashima et al. | 348/208.99 |
| 2009/0213235 | A1* | 8/2009 | Watanabe | 348/208.4 |
| 2009/0231445 | A1* | 9/2009 | Kanehiro | 348/208.2 |
| 2009/0231449 | A1* | 9/2009 | Tzur et al. | 348/208.6 |
| 2009/0284610 | A1* | 11/2009 | Fukumoto et al. | 348/208.99 |
| 2010/0026839 | A1* | 2/2010 | Border et al. | 348/231.2 |
| 2010/0157079 | A1* | 6/2010 | Atanassov et al. | 348/222.1 |

FOREIGN PATENT DOCUMENTS

| | | |
|---|---|---|
| JP | 2002-190983 | 7/2002 |
| JP | 2006-262220 | 9/2006 |
| JP | 2008-277896 | 11/2008 |
| KR | 10-2001-0036040 | 5/2001 |
| KR | 10-2006-0012278 | 2/2006 |
| KR | 10-2008-0049469 | 6/2008 |
| KR | 10-2009-0027053 | 3/2009 |

* cited by examiner

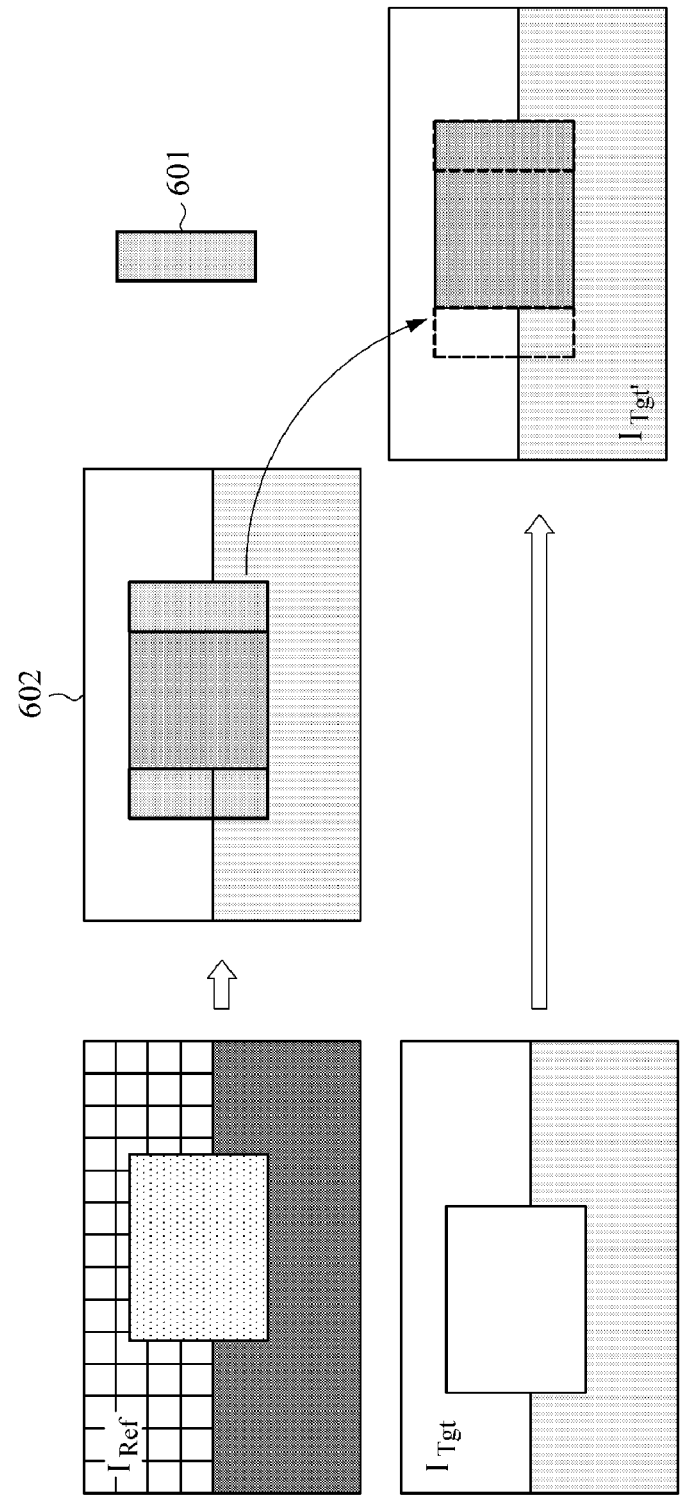

FIG.7

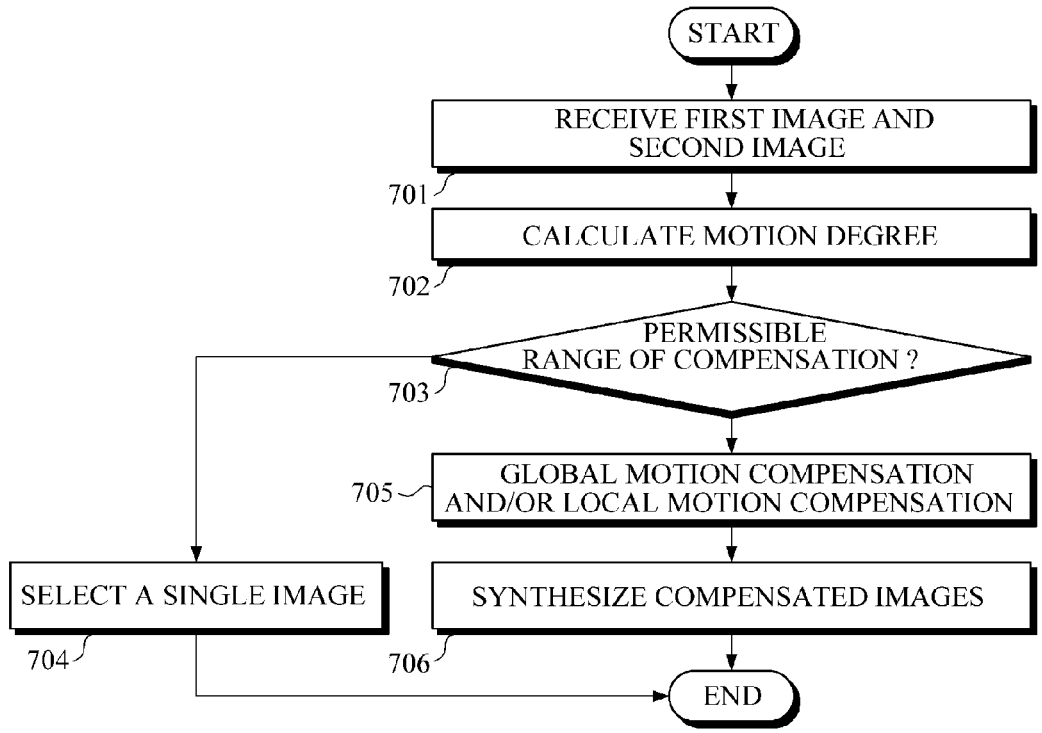

| MOTION OCCURRENCE DEGREE | SW1 | SW2 | SW3 | PRIMARILY COMPENSATION | SECONDARILY COMPENSATION | OUTPUT IMAGE |
|---|---|---|---|---|---|---|
| GLOBAL MOTION | OFF | ON | OFF | O | X | OUT_1 |
| LOCAL MOTION | OFF | OFF | ON | X | O | OUT_2 |
| COMPOSITE MOTION | ON | OFF | OFF | O | O | OUT_3 |
| BEYOND COMPENSATION RANGE | OFF | OFF | OFF | X | X | OUT_4 |

| MOTION OCCURRENCE DEGREE | SW1 | SW2 | PRIMARILY COMPENSATION | SECONDARILY COMPENSATION | OUTPUT IMAGE |
|---|---|---|---|---|---|
| GLOBAL MOTION | ON | OFF | O | X | OUT_1 |
| LOCAL MOTION | OFF | ON | - | O | OUT_2 |
| COMPOSITE MOTION | OFF | ON | O | O | OUT_3 |
| BEYOND COMPENSATION RANGE | OFF | OFF | X | X | OUT_4 |

APPARATUS AND METHOD FOR OBTAINING MOTION ADAPTIVE HIGH DYNAMIC RANGE IMAGE

CROSS-REFERENCE TO RELATED APPLICATION(S)

This application is a divisional of U.S. patent application Ser. No. 12/842,109, filed on Jul. 23, 2010, claims the benefit under 35 U.S.C. §119(a) of Korean Patent Application No. 10-2009-0067387, filed on Jul. 23, 2009, the disclosure of which is incorporated by reference in its entirety for all purposes.

BACKGROUND

1. Field

The following description relates to an image processing technology suitable for processing two images taken using different exposure times.

2. Description of the Related Art

When an image is taken using a camera in a dynamic environment, the camera generally fails to obtain an image with information appropriate for dark areas and bright areas due to the limited dynamic range of the camera. A digital still camera (DSC) in current use has a dynamic range of 50 to 60 dB which is much less than the 120 to 100 dB range of the eyes.

For example, when a plurality of images are successively taken at different exposure times in a mobile environment, an Inter-Frame motion or Intra-Frame motion may occur due to the movement of the camera and/or movement of an object in the images. Accordingly, in order to obtain a clear high dynamic range (HDR) image without an artifact, the motion occurring in the image needs to be detected and compensated for.

However, when the Inter-Frame motion occurs, in general, one of the obtained images is selectively output without motion compensation or image synthesizing. Alternatively, an additional external source or the brightness of obtained images may be analyzed to selectively output a synthesized image.

Such a motion processing scheme has a limitation in automatically obtaining a clear HDR image in a dynamic environment in which the camera/object has a high degree of freedom of motion.

SUMMARY

In one general aspect, there is provided an apparatus for obtaining a motion adaptive high dynamic range image, the apparatus including: a motion calculation unit configured to: receive a first image and a second image that are taken using different exposure times, and calculate a motion degree of the second image by comparing the first image with the second image, a first compensation unit configured to compensate the second image for global motion, a second compensation unit configured to compensate the second image for local motion, an image synthesizing unit configured to: receive images output from the first compensation unit or the second compensation unit, and synthesize the received images, a single image selection unit configured to select at least one of the first image, the second image, and an auto-exposure image, and a control unit configured to, based on the calculated motion degree, allow the first and second images to be provided to the image synthesizing unit via at least one of the first compensation unit and the second compensation unit or to the single image selection unit.

The apparatus may further include that: in response to the motion degree being global and lying within a permissible range of compensation, the control unit is further configured to allow the first and second images to be input into the image synthesizing unit via the first compensation unit, in response to the motion degree being local and lying within the permissible range of compensation, the control unit is further configured to allow the first and second image to be input into the image synthesizing unit via the second compensation unit, in response to the motion degree being composite and lying within the permissible range of compensation, the control unit is further configured to allow the first and second images to be input into the image synthesizing unit via the first and second compensation units, and in response to the motion degree lying outside the permissible range of compensation, the control unit is further configured to allow the first and second images to be input into the single image selection unit.

The apparatus may further include that the global motion compensation is performed through an image stabilizer.

The apparatus may further include that the first compensation unit is further configured to sequentially perform subsampling on the first image and the second image to reduce the longitudinal size and transverse size of the first and second images.

The apparatus may further include that a most likely direction of travel of an object is obtained from two images having a same level.

The apparatus may further include that a motion vector may be renewed based on the obtained direction of travel.

The apparatus may further include that: the first compensation unit is further configured to compensate the first image based on the renewed motion vector, and the second compensation unit is further configured to compensate the second image based on the renewed motion vector.

In another general aspect, there is provided an apparatus for obtaining a motion adaptive high dynamic range image, the apparatus including: a first compensation unit configured to: receive a first image and a second image, and compensate the second image for global motion based on the first image, a motion calculation unit configured to calculate a motion degree of the second image compensated for global motion by comparing the first image with the second image compensated for global motion, a second compensation unit configured to compensate for local motion of the second image compensated for global motion, an image synthesizing unit configured to: receive images output from the first compensation unit or the second compensation unit, and synthesize the received images, a single image selection unit configured to select at least one of the first image, the second image, and an auto-exposure image, and a control unit configured to, based on the calculated motion degree: allow the first image and the second image compensated global motion to be delivered to the image synthesizing unit, allow the first image and the second image compensated for global motion compensation to be delivered to the image synthesizing unit via the second compensation unit, or allow the first image and the second image to be delivered to the single image selection unit.

The apparatus may further include that: in response to the motion degree being global motion and lying within a permissible range of compensation, the control unit is further configured to allow the first image and the second image, which have been compensated for global motion, to be input into the image synthesizing unit, in response to the motion degree lying within the permissible range of compensation and the motion includes global motion and local motion, the control unit is further configured to allow the first image and the second image subjected to global motion compensation to be input into the image synthesizing unit via the second compensation unit, and in response to the motion degree lying outside the permissible range of compensation, the control unit is further configured to allow the first image and the second image to be input into the single image selection unit.

In another general aspect is provided an apparatus for obtaining a motion adaptive high dynamic range image, the apparatus including: an image analysis unit configured to calculate a motion degree between at least two images taken using different exposure times, a compensation processing unit configured to perform global motion compensation and/or local motion compensation based on the calculated motion degree, and an image synthesizing unit configured to synthesize images output from the compensation processing unit.

The apparatus may further include a single image selection unit configured to select at least one of the first and second images or an auto-exposure image, in response to the calculated motion degree lying outside a permissible range of compensation.

The apparatus may further include that the compensation processing unit is further configured to perform global motion compensation, local motion compensation, or both of global motion compensation and local motion compensation, based on the calculated motion degree.

In another general aspect is provided a method of obtaining a motion adaptive high dynamic range image, the method including: receiving a first image and a second image that are taken using different exposure times, calculating a motion degree of the second image based on the first image, performing global motion compensation and/or local motion compensation on the second image based on the calculated motion degree, and synthesizing the first image with the second image which has been subject to the motion compensation.

The method may further include: determining whether the calculated motion degree lies within a permissible range of compensation, and in response to the calculated motion degree lying outside the permissible range of compensation, selecting one of the first image, the second image, and an auto-exposure image.

The method may further include that the performing of compensation includes performing only the global motion compensation, performing only the local motion compensation, or performing both of the global motion compensation and the local motion compensation.

Other features and aspects may be apparent from the following detailed description, the drawings, and the claims.

BRIEF DESCRIPTION OF THE DRAWINGS

FIG. 6 is a view showing an example method of compensating for local motion.

FIG. 7 is a view showing an example method of obtaining an image.

Figure 1:
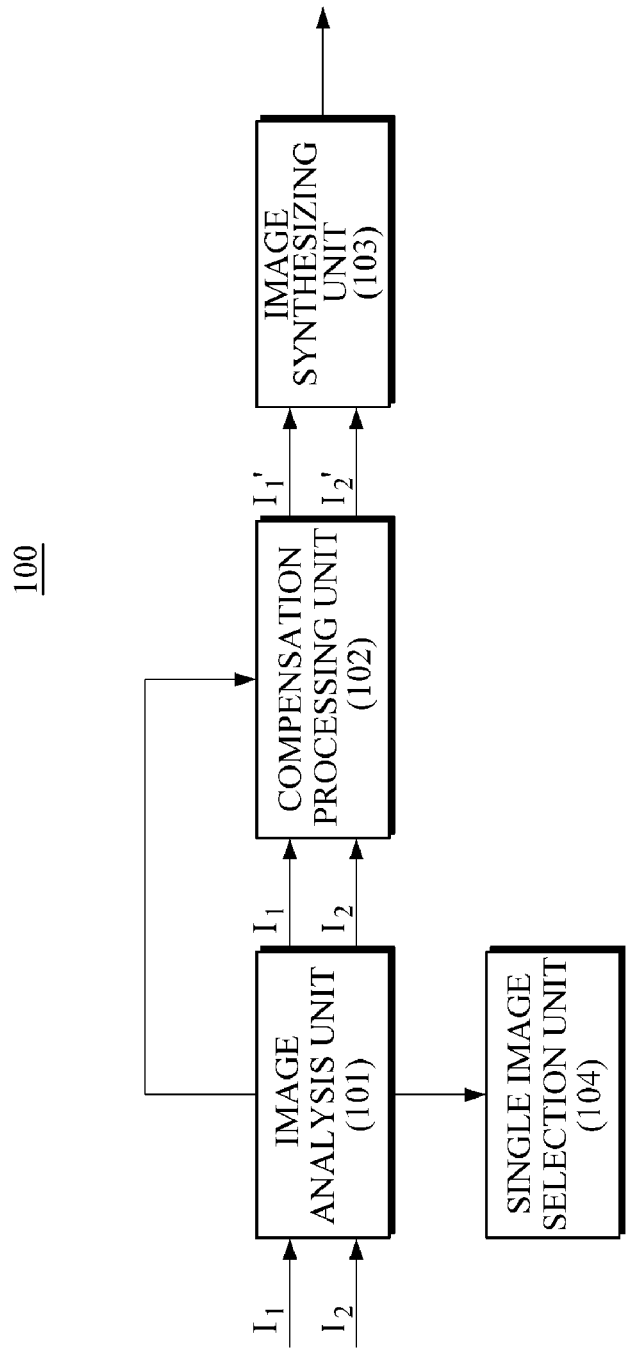
FIG. 1 is a view showing an example image obtaining apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 is a view showing an example image obtaining apparatus.

As shown in FIG. 1, an image obtaining apparatus 100 may include an image analysis unit 101, a compensation processing unit 102, an image synthesizing unit 103, and a single image selection unit 104.

The image obtaining apparatus 100 may be configured in a system for obtaining at least two images taken using different exposure times and may be implemented in the form of a circuit, an application program, a software architecture, and a hardware architecture used to compensate for an artifact which appears in an image due to movement of a camera or an object.

The image analysis unit 101 may receive a first image $I_1$ and a second image $I_2$ that are taken using different exposure times. For example, the first image $I_1$ may be taken using a short exposure time and the second image $I_2$ may be taken using a long exposure time.

The image analysis unit 101 may compare the first image $I_1$ with the second image $I_2$ to calculate a motion degree to which a motion occurs. The motion degree is defined as the number of pixels changed due to the movement of a camera or an object, or as the size of motion vector estimated between the first and second images $I_1$ and $I_2$ while successively taking the first image $I_1$ and the second image.

For example, the image analysis unit 101 may obtain the motion degree by setting the first image $I_1$ as a reference image, detecting pixels of the second image $I_2$ different from those of the first image $I_1$ through comparison of the first image $I_1$ and the second image $I_2$, and by counting the number of detected different pixels. Alternatively, the image analysis unit 101 may obtain the motion degree by moving the second image $I_2$, e.g., upward/downward/left/right, with respect to the first image $I_1$ until the two image match each other at the maximum degree to estimate the movement direction and size of the second image $I_2$ as a global motion vector. Alternatively, the image analysis unit 101 may obtain the motion degree by dividing the first image $I_1$ and the second image $I_2$ into sub-blocks and moving each block of the second image $I_2$ corresponding to each block of the first image $I_1$ upward/downward/left/right to estimate the optimum movement direction and size of each block of the second image $I_2$ as a local motion vector.

The compensation processing unit 102 may perform at least one of the global motion compensation and the local motion compensation based on the calculated motion occurrence degree.

The motion may include a global motion and a local motion. The global motion represents an artifact occurring, e.g., due to movement of a camera such as hand shake during photographing. For example, the global motion may occur when an object is fixed but a camera moves during photographing to produce an inter-frame motion in the image. The local motion is an artifact occurring, e.g., when an object moves during photographing. For example, the local motion may occur when the camera position is fixed, but an object moves during photographing to produce an intra-frame motion in the image.

The example motion compensation may be achieved by extracting unmatched pixels of input two images through comparison of the two images and changing a pixel value of a target image into a pixel value of a reference image. For example, the compensation processing unit 102 may perform an adaptive compensation based on the calculated motion degree, so that the high dynamic range image may be generated with clearer image quality.

The details of the example global motion compensation and local motion compensation will be described later.

The image synthesizing unit 103 may synthesize images output from the compensation processing unit 102. For example, the image synthesizing unit 103 may synthesize the first image $I_1$ with a compensated second image $I_2'$.

The single image selection unit 104 may select one of the first image, the second image $I_1$, the second image $I_2$, and an auto-exposure image in response to the calculated motion degree lying outside a permissible range of compensation. The auto-exposure image may be taken under a condition in which exposure time is automatically adjusted such that the average brightness of an image or the average brightness of a predetermined area, for example, a central area of an image has a value within a predetermined range. Alternatively, the single image selection unit 104 may select the one of the first image $I_1$ and the second image $I_2$ which may be taken using an exposure time closest to that of the auto-exposure image.

Figure 2:
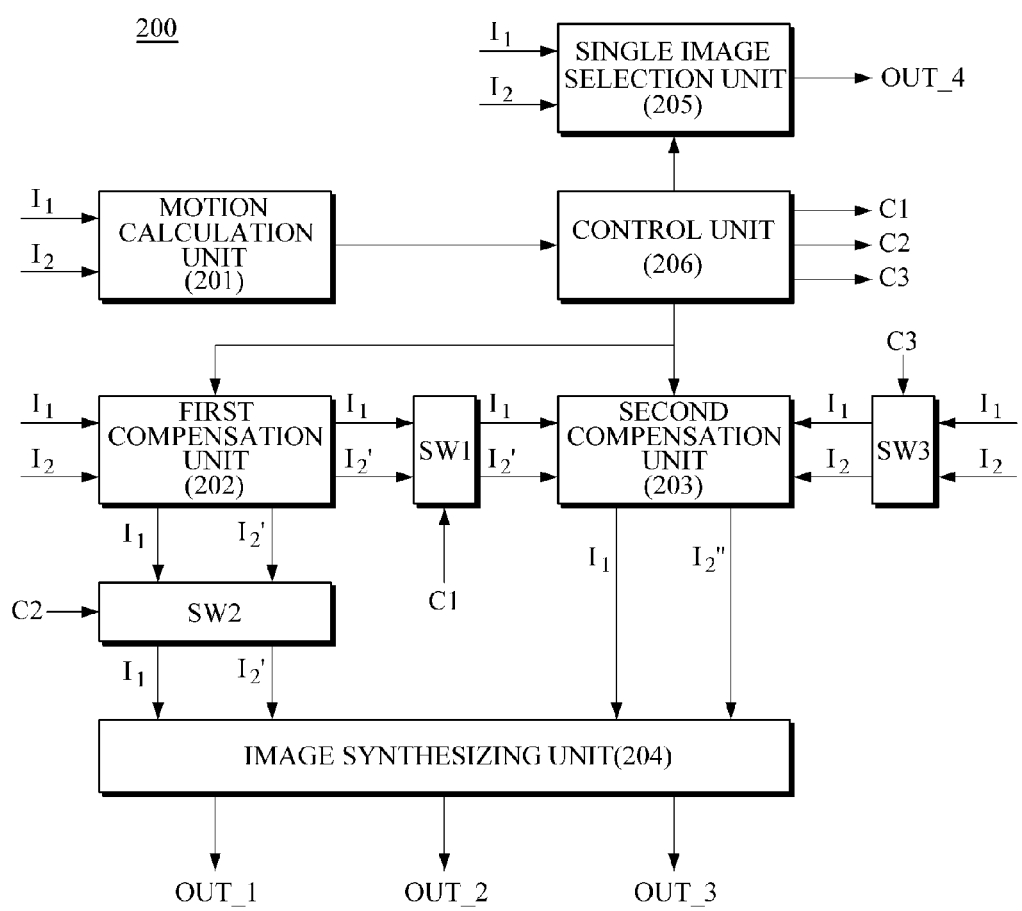
FIG. 2 is a view showing another example image obtaining apparatus.

FIG. 2 is a view showing another example image obtaining apparatus.

As shown in FIG. 2, an image obtaining apparatus 200 may include a motion calculation unit 201, a first compensation unit 202, a second compensation unit 203, an image synthesizing unit 204, a single image selection unit 205, and a control unit 206.

The motion calculation unit 201 may receive at least two images taken using different exposure times, and may set one of the received images as a first image $I_1$ and another image as a second image $I_2$.

The motion calculation unit 201 may compare the first image $I_1$ with the second image $I_2$ to calculate a motion degree of the second image $I_2$. For example, the motion calculation unit 201 may set the first image $I_1$ as a reference image, compare the first image $I_1$ set as the reference image with the second image $I_2$ to detect pixels which are different with corresponding ones of the first image $I_1$, and count the number of the detected different pixels.

The first compensation unit 202 may receive the first image $I_1$ and the second image $I_2$ and may compensate the second image $I_2$ for global motion. For example, $I_2'$ shown in FIG. 2 represents a second image subjected to global motion compensation.

The second compensation unit 203 may receive the first image $I_1$ and the second image $I_2$, or the first image $I_1$ and the global motion-compensated second image $I_2'$, and may compensate for local motion of the second image $I_2$ or the global motion-compensated second image $I_2'$. For example, $I_2''$ shown in FIG. 2 represents a second image subjected to local motion compensation or a global motion compensated-second image subjected to local motion compensation.

The image synthesizing unit 204 may receive images output from the first compensation unit 202 or images output from the second compensation unit 203 and may synthesize the received images.

The single image selection unit 205 may select at least one of the first image $I_1$, the second image $I_2$ and the auto-exposure image. Alternatively, the signal image selection unit 205 may select one of the first image $I_1$ and the second image $I_2$, which may be taken using an exposure time closest to that of the auto-exposure image.

The control unit 206 may control the first compensation unit 202, the second compensation unit 203, and the single image selection unit 205 based on the calculated motion degree. In addition, the control unit 206 may control ON/OFF operation of respective switches SW1, SW2 and SW3.

The description below will be made in relation to a motion degree of the second image $I_2$ which may include only global motion.

The global motion may occur when an object is fixed but a camera moves during photographing, so that inter-frame motion is produced in the image.

If the second image $I_2$ has only global motion, the control unit 206 may control respective components of the image obtaining apparatus such that the first and second images $I_1$ and $I_2$ are delivered to the image synthesizing unit 204 through the first compensation unit 202. For example, the control unit 206 may turn off the first switch SW1, turn on the second switch SW2, and turn off the third switch SW3. In one example, the first and second images $I_1$ and $I_2$ may be input into the first compensation unit 202. The first compensation unit 202 may compensate the second image $I_2$ for global motion (i.e., primary compensation) and may output the first image $I_1$ and the compensated second image $I_2'$. The first image $I_1$ and the compensated second image $I_2'$ may be input into the image synthesizing unit 204 through the second switch SW2. The image synthesizing unit 204 may synthesize the first image $I_1$ with the compensated second image $I_2'$ to output OUT_1.

The description below will be made in relation to a motion degree of the second image $I_2$ which may include only local motion.

The local motion may occur when a camera is fixed but an object moves during photographing so that an intra-frame motion is produced in the image.

If the second image $I_2$ includes only local motion, the control unit 206 may control respective components of the image obtaining apparatus such that the first and second images $I_1$ and $I_2$ are delivered to the image synthesizing unit 204 through the second compensation unit 203. For example, the control unit 206 may turn off the first switch SW1 and the second switch SW2, and turn on the third switch SW3. In one example, the first and second images $I_1$ and $I_2$ may be input into the second compensation unit 203. The second compensation unit 203 may compensate the second image $I_2$ for local motion (i.e., secondary compensation) and may output the first image $I_1$ and the compensated second image $I_2''$. The first image $I_1$ and the compensated second image $I_2''$ may be input into the image synthesizing unit 204. The image synthesizing unit 204 may synthesize the first image $I_1$ with the compensated second image $I_2''$ to output OUT_2.

The description below will be made in relation to a motion degree of the second image $I_2$ which may include global motion and local motion.

If the second image $I_2$ has global motion and local motion, the control unit 206 may control respective components of the image obtaining apparatus such that the first and second images $I_1$ and $I_2$ are delivered to the image synthesizing unit 204 through the first compensation unit 202 and the second compensation unit 203. For example, the control unit 206 may turn on the first switch SW1, and turn off the second switch SW2 and the third switch SW3. In one example, the first and second images $I_1$ and $I_2$ may be firstly input into the first compensation unit 202. The first compensation unit 202 may compensate the second image $I_2$ for global motion and may output the first image $I_1$ and a primarily-compensated second image $I_2'$. The first image $I_1$ and the primarily-compensated second image $I_2'$ may be input into the second compensation unit 203. The second compensation unit 203 may compensate the primarily-compensated second image $I_2'$ for local motion and may output the first image $I_1$ and a secondarily-compensated second image $I_2''$. The first image $I_1$ and the secondarily-compensated second image $I_2''$ may be input into the image synthesizing unit 204. The image synthesizing unit 204 may synthesize the first image $I_1$ with the secondarily-compensated second image $I_2''$ to output OUT_3.

The description below will be made in relation to a motion degree of the second image $I_2$ which may include a motion beyond a permissible range of compensation.

If the second image $I_2$ has a motion beyond a permissible range of compensation, the control unit 206 may control respective components of the image obtaining apparatus such that the single image selection unit 205 solely operates. For example, the control unit 206 may turn off the first, second and third switches SW1, SW2, and SW3. In one example, the first and second images $I_1$ and $I_2$ may be input into the single image selection unit 205. The single image selection unit 205 may select one of the first image $I_1$, the second image $I_2$ and the auto-exposure image. Alternatively, the single image selection unit 205 may select the one of the first and second images $I_1$ and $I_2$, which may be taken under exposure time closest to that of the auto-exposure image.

The above description can be summarized as the following Table 1, where "O" represents that the primary or secondary compensation is used, and "X" represents that the primary or secondary compensation is not used.

TABLE 1

| Motion degree | SW1 | SW2 | SW3 | Primary Compensation | Secondary Compensation | Output Image |
|---|---|---|---|---|---|---|
| Global Motion | OFF | ON | OFF | O | X | OUT_1 |
| Local Motion | OFF | OFF | ON | X | O | OUT_2 |
| Composite Motion | ON | OFF | OFF | O | O | OUT_3 |
| Beyond Compensation Range | OFF | OFF | OFF | X | X | OUT_4 |

In FIG. 2, the image obtaining apparatus has been represented in the form of a circuit. However, another example image obtaining apparatus may be implemented in an application program, a software architecture, or a hardware architecture.

Figure 3:
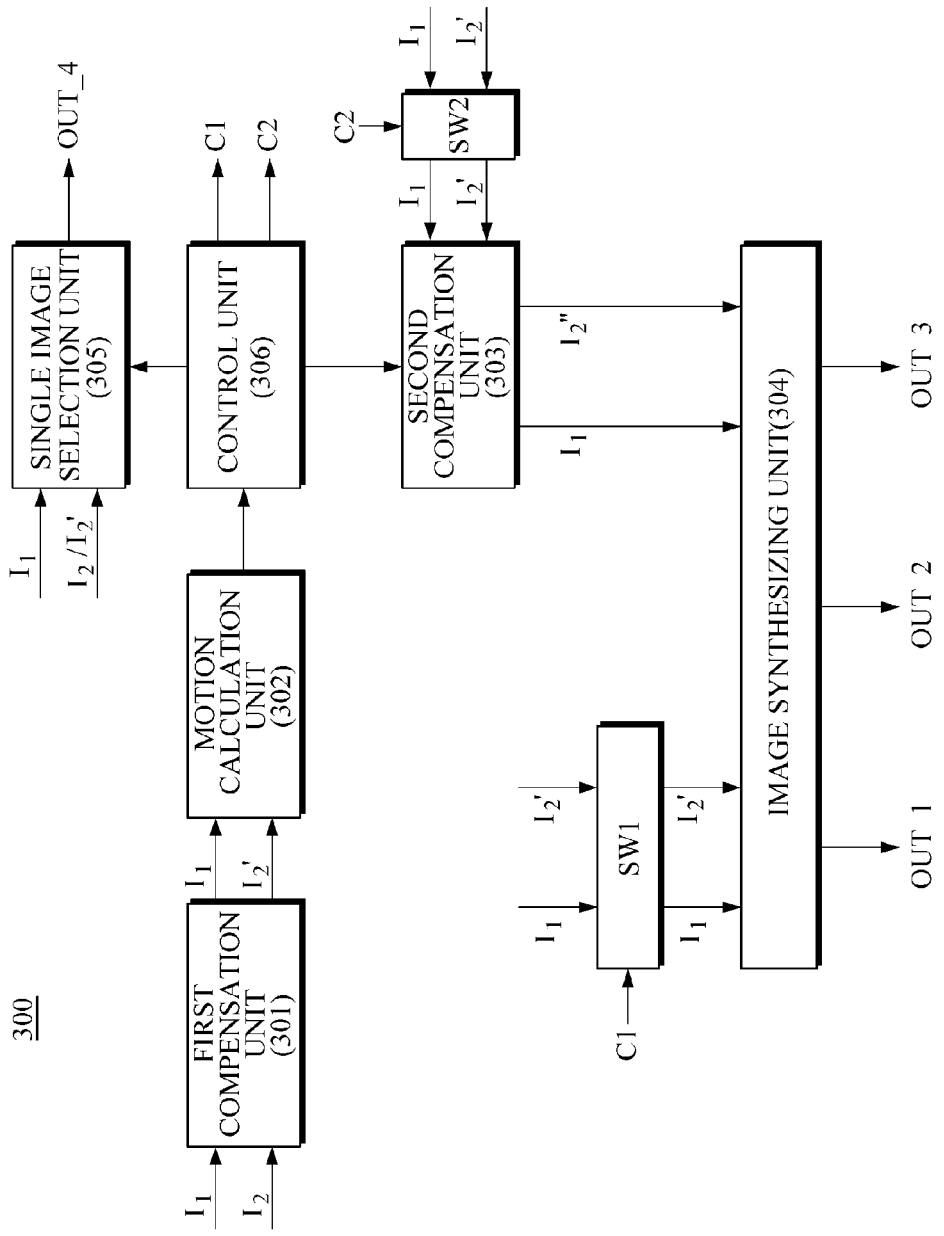
FIG. 3 is a view showing still another example image obtaining apparatus.

FIG. 3 is a view showing still another example image obtaining apparatus.

As shown in FIG. 3, an image obtaining apparatus 300 may include a first compensation unit 301, a motion calculation unit 302, an image synthesizing unit 304, a single image selection unit 305, and a control unit 306.

The first compensation unit 301 may receive at least two images taken using different exposure times, set one of the received images as a first image $I_1$ and another image as a second image $I_2$, and compensate the second image $I_2$ for global motion based on the first image $I_1$.

The motion calculation unit 302 may compare the first image $I_1$ with the global motion-compensated second image $I_2'$ to calculate a motion degree of the global motion-compensated second image $I_2'$.

The second compensation unit 303 may receive the first image $I_1$ and the global motion-compensated second image $I_2'$, and compensate the global motion-compensated second image $I_2'$ for local motion.

The image synthesizing unit 304 may receive images output from the first compensation unit 301 or images output from the second compensation unit 303 and may synthesize the received images.

The single image selection unit 305 may select at least one of the first image $I_1$, the second image $I_2$, the global motion-compensated second image $I_2'$, and the auto-exposure image. Alternatively, the signal image selection unit 305 may select one of the first image $I_1$, the second image $I_2$, and the global motion-compensated second image $I_2'$, which may be taken using an exposure time closest to that of the auto-exposure image.

The control unit 306 may control the second compensation unit 303 and the single image selection unit 305 based on the motion degree calculated in the motion calculation unit 302. In addition, the control unit 306 may control ON/OFF operation of respective switches SW1 and SW2.

The description below will be made in relation to a motion degree of the second image $I_2$ which may include only global motion.

The global motion may occur when an object in the first image $I_1$ and the second image $I_2$ is fixed, but a camera moves during photographing so that an inter-frame motion is produced in the image.

If the second image $I_2$ includes only global motion, as the second image $I_2$ passes through the first compensation unit 301, image obtaining apparatus 300 may compensate for the global motion. Therefore, the motion calculation unit 302 may determine that motion is not present in the first image $I_1$ and the global motion-compensated second image $I_2'$. In one example, the control unit 306 may turn on the first switch SW1 and turn off the second switch SW2, such that the first image $I_1$ and the global motion-compensated second image $I_2'$ are input into the image synthesizing unit 304. The image synthesizing unit 304 may synthesize the first image $I_1$ with the compensated second image $I_2'$ to output OUT_1.

The description below will be made in relation to a motion degree of the second image $I_2$ which may include only local motion.

The local motion may occur when a camera is fixed but an object moves during photographing so that an intra-frame motion is produced in the image.

If the second image $I_2$ includes only local motion, even if the second image $I_2$ passes through the first compensation unit 301, the local motion may still remain. Accordingly, the control unit 306 may control respective components of the image obtaining apparatus such that the first image $I_1$ and the primarily-compensated second images $I_2'$ are delivered to the image synthesizing unit 304 through the second compensation unit 303 based on the motion degree calculated in the motion calculation unit 302. For example, the control unit 306 may turn off the first switch SW1 and turn on the second switch SW2. Where the second image $I_2$ includes only local motion, the images $I_2'$ and $I_2$ output from the first compensation unit 301 may be identical to each other. That is, the original second image $I_2$ may be identical to the primarily-compensated second image $I_2'$.

In one example, the first image $I_1$ and the second image $I_2'$ may be input into the second compensation unit 303. The second compensation unit 303 may compensate the second image $I_2'$ for local motion and may output the first image $I_1$ and the compensated second image $I_2''$. The first image $I_1$ and the compensated second image $I_2''$ may be input into the image synthesizing unit 304. The image synthesizing unit 304 may synthesize the first image $I_1$ with the compensated second image $I_2''$ to output OUT_2.

The description below will be made in relation to a motion degree of the second image $I_2$ which may have both global motion and local motion.

If the second image $I_2$ has global motion and local motion, as the second image $I_2$ passes through the first compensation unit 301, the global motion may be removed. However, the local motion may still remain in the image $I_2$. Accordingly, the control unit 306 may control respective components of the image obtaining apparatus such that the first image $I_1$ and the primarily-compensated second images $I_2'$ are delivered to the image synthesizing unit 304 through the second compensation unit 303. For example, the control unit 306 may turn off the first switch SW1, and turn on the second switch SW2. Where the second image $I_2$ includes the global motion and location motion, the image $I_2'$ may represent an image which is output from the first compensation unit 301 and may be subject to global motion compensation.

In one example, the first image $I_1$ and the primarily-compensated second image $I_2'$ may be input into the second compensation unit 303. The second compensation unit 303 may compensate the primarily-compensated second image $I_2'$ for local motion and may output the first image $I_1$ and a secondarily-compensated second image $I_2''$. The first image $I_1$ and the secondarily-compensated second image $I_2''$ may be input into the image synthesizing unit 304. The image synthesizing unit 304 may synthesize the first image $I_1$ with the secondarily-compensated second image $I_2''$ to output OUT_3.

The description below will be made in relation to a motion degree of the second image $I_2$ which may include motion beyond a permissible range of compensation.

If the second image $I_2$ includes motion beyond a permissible range of compensation, even after the second image $I_2$ passes through the first compensation unit 301, a motion artifact may still remain in the second image $I_2$. Accordingly, the control unit 306 may control respective components of the image obtaining apparatus such that the single image selection unit 305 solely operates based on the motion degree calculated in the motion calculation unit 302. For example, the control unit 306 may turn off the first and second switches SW1 and SW2. As a result, the first and second images $I_1$ and $I_2$ may be input into the single image selection unit 305. The single image selection unit 305 may select one of the first image $I_1$, the second image $I_2$, and the auto-exposure image. Alternatively, the single image selection unit 305 may select the one of the first and second images $I_1$ and $I_2$ which may be taken using an exposure time closest to that of the auto-exposure image.

The above description may be summarized as follows in Table 2, where "O" represents that the primary or secondary compensation is used, and "X" represents that the primary or secondary compensation is not used.

TABLE 2

| Motion degree | SW1 | SW2 | Primary Compensation | Secondary Compensation | Output Image |
|---|---|---|---|---|---|
| Global Motion | ON | OFF | O | X | OUT_1 |
| Local Motion | OFF | ON | — | O | OUT_2 |
| Composite Motion | OFF | ON | O | O | OUT_3 |
| Beyond Compensation Range | OFF | OFF | X | X | OUT_4 |

As described above, the compensation intensity and the image to be synthesized may be adaptively adjusted based on the motion degree of the image.

Figure 4:
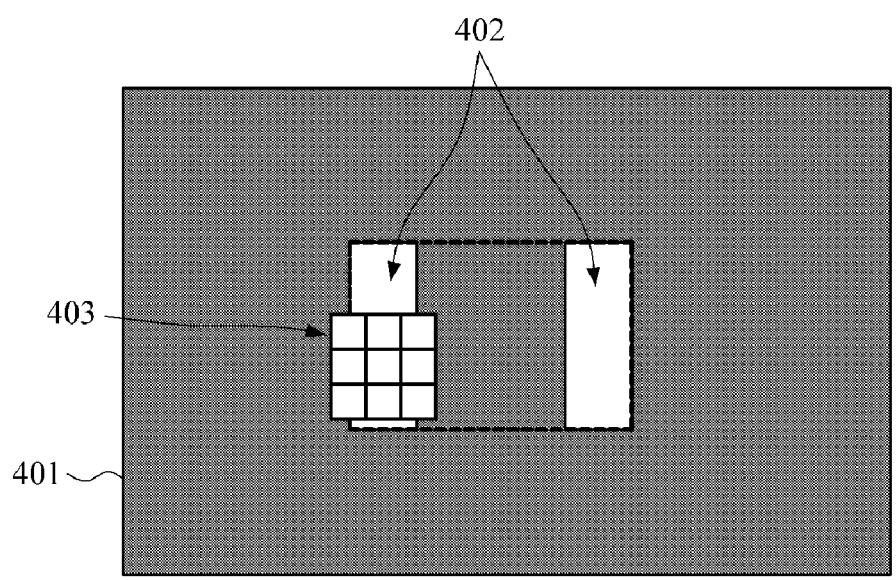
FIG. 4 is a view showing an example method of calculating a motion degree.

FIG. 4 is a view showing an example method of calculating the motion degree.

In FIG. 4, reference numeral 401 indicates a difference image (Id). The difference image 401 may be determined as a difference in intensity between the first image and the second image when the brightness of the first image is matched to the brightness of the second image.

In FIG. 4, reference numeral 402 indicates a motion area at which an artifact of motion is present. The motion area 402 may include a set of pixels which are found to be different between the first image and the second image when pixels of the first and second images are compared.

In FIG. 4, when a checking window 403 scans the difference image 401, pixels corresponding to the motion area 402 and included in the checking window 403 may be counted. The motion degree may be determined or calculated as a ratio of the number of pixels corresponding to the motion area 402 with respect to the number of the total pixels of the checking window 403.

The calculated motion degree may serve as a reference used to determine which of global motion compensation and local motion compensation is performed. For example, the motion calculation units 201 and 302 may compare the calculated motion degree with a predetermined critical value, and may provide the control units 206 and 306 with signals based on the comparison result. The critical value may vary with the resolution of input images.

In FIG. 4, the first image and the second image may represent an original input image or an input image subjected to global motion compensation, for example, $I_2'$. In addition, the motion degree may be calculated by estimating a global motion vector and a local motion vector between the first and second images.

Figure 5:
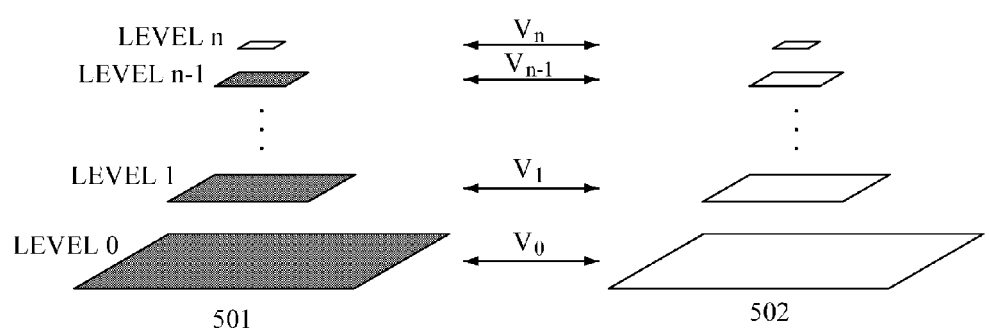
FIG. 5 is a view showing an example method of compensating for global motion.

FIG. 5 is a view showing an example method of compensating for global motion.

As shown in FIG. 5, the first compensation unit may sequentially perform sub-sampling on the first image 501 and the second image 502 to reduce the longitudinal size and transverse size of the images 501 and 502 by half, generating an image pyramid for sampling levels. In addition, a most likely direction of travel of an object may be obtained from two images having the same level (e.g., a level n, where n is an integer), and a motion vector (e.g., a vector $V_n$, where n is an integer) may be renewed based on the obtained direction of travel. The first image 501 and the second image 502 may be compensated based on the renewed motion vector. The global motion compensation is not limited to FIG. 5, and may be performed in other fashions, e.g., through an image stabilizer.

FIG. 6 is a view showing an example method of compensating for local motion.

As shown in FIG. 6, the second compensation unit may replace pixels corresponding to a motion occurrence area 601 of a target image ($I_{tgt}$) with pixels of a reference image ($I_{Ref}$).

As described above, the target image to be compensated may be the second image or the primarily-compensated second image, and the reference image may be the first image. However, the target image and the reference image may not always be determined as described above, but the reference image may be selected as an image comprising the fewest saturation pixels or as an image having the smallest loss of pixel value due to noise.

In addition, the process of matching brightness between the target image and the reference image may be added before the replacement of pixels. For example, in FIG. 6, reference numeral 602 represents a reference image having a brightness matched to that of the target image.

The process shown in FIG. 6 may be performed after a conventional local motion compensation has been performed on the first image, the second image or the primarily-compensated second image. According to an example of the conventional location motion compensation, first, a target image and a reference image are divided into sub-block units. Then an interpolation is performed on a local motion vector estimated at each sub-block to output a local motion vector of each pixel. After that, a pixel value of a position corresponding to the local motion vector of the each pixel is obtained.

An example method of obtaining an image will be described with reference to FIG. 1 and FIG. 7. FIG. 7 is a flowchart showing an example method of obtaining an image.

At operation 701, the image analysis unit 101 may receive the first image and the second image. The first image and the second image may be respectively taken using different exposure times.

In operation 702, the image analysis unit 101 may calculate the motion degree of the first image and the second image. For example, the image analysis unit 101 may set the first image as a reference image and then calculate a mismatch degree of the second image with the first image.

In operation 703, the image analysis unit 101 may determine whether the calculated motion degree lies within a permissible range of compensation. For example, the image analysis unit 101 may compare the calculated motion degree with a predetermined critical value, determining whether the motion degree lies within the permissible range of compensation.

In operation 704, based on the determination result, in response to the motion degree being beyond the permissible range of compensation, the single image selection unit 104 may select one of the first image, the second image, and the auto-exposure image. Alternatively, in operation 705, in response to the motion degree lying within the permissible range of compensation, the compensation processing unit 102 may perform global motion compensation and/or local motion compensation based on the calculated motion degree. For example, one of global motion compensation (i.e., primary compensation) and local motion compensation (i.e., secondary compensation) may be solely performed, or both of global motion compensation and local motion compensation may be performed. In operation 706, the compensated images may be synthesized by the image synthesizing unit 103.

According to the image obtaining system described above, even if a camera or an object moves during photographing, the compensation intensity may be adaptively adjusted corresponding to the motion degree, so that a clear image may be obtained in a high dynamic range environment.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for obtaining a motion adaptive high dynamic range image, the apparatus comprising:
   a motion calculation unit configured to:
      receive a first image and a second image that are taken using different exposure times; and
      calculate a motion degree of the second image by comparing the first image with the second image;
   a first compensation unit configured to compensate the second image for global motion;
   a second compensation unit configured to compensate the second image for local motion;
   an image synthesizing unit configured to:
      receive images output from the first compensation unit or the second compensation unit; and
      synthesize the received images;
   a single image selection unit configured to select at least one of the first image, the second image, and an auto-exposure image; and
   a control unit configured to, based on the calculated motion degree, allow the first and second images to be provided to the image synthesizing unit via at least one of the first compensation unit and the second compensation unit or to the single image selection unit,
   wherein:
   in response to the motion degree being global and lying within a permissible range of compensation, the control unit is further configured to allow the first and second images to be input into the image synthesizing unit via the first compensation unit;
   in response to the motion degree being local and lying within the permissible range of compensation, the control unit is further configured to allow the first and second images to be input into the image synthesizing unit via the second compensation unit;

in response to the motion degree being composite and lying within the permissible range of compensation, the control unit is further configured to allow the first and second images to be input into the image synthesizing unit via the first and second compensation units; and in response to the motion degree lying outside the permissible range of compensation, the control unit is further configured to allow the first and second images to be input into the single image selection unit, wherein the global motion compensation is performed through an image stabilizer, and wherein the motion calculation unit, the first compensation unit, the second compensation unit, the image synthesizing unit, the single image selection unit, the control unit, or any combination thereof is implemented by a processor.

2. An apparatus for obtaining a motion adaptive high dynamic range image, the apparatus comprising:

a motion calculation unit configured to:
  receive a first image and a second image that are taken using different exposure times; and
  calculate a motion degree of the second image by comparing the first image with the second image;

a first compensation unit configured to compensate the second image for global motion;

a second compensation unit configured to compensate the second image for local motion;

an image synthesizing unit configured to:
  receive images output from the first compensation unit or the second compensation unit; and
  synthesize the received images;

a single image selection unit configured to select at least one of the first image, the second image, and an auto-exposure image; and a control unit configured to, based on the calculated motion degree, allow the first and second images to be provided to the image synthesizing unit via at least one of the first compensation unit and the second compensation unit or to the single image selection unit, wherein:

in response to the motion degree being global and lying within a permissible range of compensation, the control unit is further configured to allow the first and second images to be input into the image synthesizing unit via the first compensation unit;

in response to the motion degree being local and lying within the permissible range of compensation, the control unit is further configured to allow the first and second images to be input into the image synthesizing unit via the second compensation unit;

in response to the motion degree being composite and lying within the permissible range of compensation, the control unit is further configured to allow the first and second images to be input into the image synthesizing unit via the first and second compensation units; and in response to the motion degree lying outside the permissible range of compensation, the control unit is further configured to allow the first and second images to be input into the single image selection unit, wherein the first compensation unit is further configured to sequentially perform sub-sampling on the first image and the second image to reduce the longitudinal size and transverse size of the first and second images, and wherein the motion calculation unit, the first compensation unit, the second compensation unit, the image synthesizing unit, the single image selection unit, the control unit, or any combination thereof is implemented by a processor.

3. The apparatus of claim 2, wherein a most likely direction of travel of an object is obtained from two images having a same level.

4. The apparatus of claim 3, wherein a motion vector may be renewed based on the obtained direction of travel.

5. The apparatus of claim 4, wherein:
the first compensation unit is further configured to compensate the first image based on the renewed motion vector; and
the second compensation unit is further configured to compensate the second image based on the renewed motion vector.

6. A method for obtaining a motion adaptive high dynamic range image, the method comprising:

receiving a first image and a second image that are taken using different exposure times;

calculating a motion degree of the second image by comparing the first image with the second image;

compensating the second image for global motion by a first compensation unit;

compensating the second image for local motion by a second compensation unit;

receiving images output from the first compensation unit or the second compensation unit by an image synthesizing unit;

synthesizing the received images by the image synthesizing unit;

selecting at least one of the first image, the second image, and an auto-exposure image by a single image selection unit;

based on the calculated motion degree, allowing the first and second images to be provided to the image synthesizing unit via at least one of the first compensation unit and the second compensation unit or to the single image selection unit, wherein:

in response to the motion degree being global and lying within a permissible range of compensation, the allowing of the first and second images to be provided to the image synthesizing unit operation includes allowing the first and second images to be input into the image synthesizing unit via the first compensation unit;

in response to the motion degree being local and lying within the permissible range of compensation, the allowing of the first and second images to be provided to the image synthesizing unit operation includes allowing the first and second images to be input into the image synthesizing unit via the second compensation unit;

in response to the motion degree being composite and lying within the permissible range of compensation, the allowing of the first and second images to be provided to the image synthesizing unit operation includes allowing the first and second images to be input into the image synthesizing unit via the first and second compensation units; and in response to the motion degree lying outside the permissible range of compensation, the allowing of the first and second images to be provided to the image synthesizing unit operation includes allowing the first and second images to be input into the single image selection unit, and wherein the global motion compensation is performed through an image stabilizer.

7. A method for obtaining a motion adaptive high dynamic range image, the method comprising:

receiving a first image and a second image that are taken using different exposure times;

calculating a motion degree of the second image by comparing the first image with the second image;

compensating the second image for global motion by a first compensation unit;

compensating the second image for local motion by a second compensation unit;

receiving images output from the first compensation unit or the second compensation unit by an image synthesizing unit;

synthesizing the received images by the image synthesizing unit;

selecting at least one of the first image, the second image, and an auto-exposure image by a single image selection unit;

based on the calculated motion degree, allowing the first and second images to be provided to the image synthesizing unit via at least one of the first compensation unit and the second compensation unit or to the single image selection unit, wherein:

in response to the motion degree being global and lying within a permissible range of compensation, the allowing of the first and second images to be provided to the image synthesizing unit operation includes allowing the first and second images to be input into the image synthesizing unit via the first compensation unit;

in response to the motion degree being local and lying within the permissible range of compensation, the allowing of the first and second images to be provided to the image synthesizing unit operation includes allowing the first and second images to be input into the image synthesizing unit via the second compensation unit;

in response to the motion degree being composite and lying within the permissible range of compensation, the allowing of the first and second images to be provided to the image synthesizing unit operation includes allowing the first and second images to be input into the image synthesizing unit via the first and second compensation units; and in response to the motion degree lying outside the permissible range of compensation, the allowing of the first and second images to be provided to the image synthesizing unit operation includes allowing the first and second images to be input into the single image selection unit, and wherein the first compensation unit is further configured to sequentially perform sub-sampling on the first image and the second image to reduce the longitudinal size and transverse size of the first and second images.

* * * * *